(12) United States Patent
Fushiki et al.

(10) Patent No.: US 6,462,748 B1
(45) Date of Patent: Oct. 8, 2002

(54) SYSTEM AND METHOD FOR PROCESSING COLOR OBJECTS IN INTEGRATED DUAL COLOR SPACES

(75) Inventors: Ikko Fushiki; Andrew C. Godfrey, both of Redmond; J. Andrew Goossen, Issaquah; Hock San Lee, Redmond; Michael D. Stokes, Redmond; Gilman K. Wong, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/556,215

(22) Filed: Apr. 24, 2000

Related U.S. Application Data

(60) Provisional application No. 60/184,874, filed on Feb. 25, 2000.

(51) Int. Cl.[7] ............................................. G06T 11/40
(52) U.S. Cl. ...................................... 345/604; 345/591
(58) Field of Search ................................ 345/589, 599, 345/591, 592, 594, 595, 600, 603, 604, 611, 615, 617; 382/162, 167, 169

(56) References Cited

U.S. PATENT DOCUMENTS 6,320,592 B1 * 11/2001 Evans et al. ................. 345/600

OTHER PUBLICATIONS

International Electrotechnical Commission, Multimedia systems and equipment—Colour measurement and management—Part 2-2: Colour management—Extended RGB colour space—scRGB, 1999, [Online], [retrieved on Apr. 3, 2002] . . . continued on next line.*

IEC, Third Working Draft (3WD), 1–10 [Retrieved from:// w3.hike.te.chiba–u.ac.jp/IEC/100/TA2/parts/part2–2/ 1966_103.pdf].*

* cited by examiner

Primary Examiner—Matthew Luu
Assistant Examiner—G. F. Cunningham
(74) Attorney, Agent, or Firm—Leydig, Voit & Mayer, Ltd.

(57) ABSTRACT

A system and method for processing color objects provides optimal processing quality by supporting both a perceptual-based color space and a physical-based color space and utilizing both color spaces for color processing in an integrated manner transparent to the end user. The graphics engine of the system includes a module for converting a color object being processed between the perceptual-base color space and the physical-based color space. During color processing that may involve various perceptual-based and physical-based operations, the graphics engine automatically converts the color object from one of the perceptual-based and physical-based color spaces to the other depending on the color processing operation to be performed. The graphics engine may also perform conversions on input graphic data from an input device to one of the dual color spaces for processing and converting a processed class object into the color space of an output device for displaying or printing.

20 Claims, 4 Drawing Sheets

SYSTEM AND METHOD FOR PROCESSING COLOR OBJECTS IN INTEGRATED DUAL COLOR SPACES

CROSS-REFERENCE TO RELATED APPLICATIONS

This patent claims the priority of U.S. Provisional Application Ser. No. 60/184,874, filed Feb. 25, 2000.

TECHNICAL FIELD OF THE INVENTION

This invention relates generally to computer graphics, and more particularly to the use of a computer to perform various color processing operations, such as contrast adjustment, anti-aliasing, etc., on a color object.

BACKGROUND OF THE INVENTION

The unambiguous representation and accurate reproduction of a color image is a rather complex and often difficult subject matter. Historically, various color processing and reproduction techniques have been developed and used in several somewhat related but largely independent industries, such as movie filming, television, photography, and printing. Each of these industries deals with a different set of constraints and conditions relating to the physical devices or media used to capture or reproduce the color images, such as a TV camera, a color film, or a color printer. As a result, many different color spaces have been developed to model and describe the colors of images in different applications. Some of the commonly used color spaces are defined by adopted industrial standards, such as the CIEXYZ and CIELAB color spaces by the Commission Internationale de l'Eclairage (CIE). Other color spaces, however, are often ad hoc and/or proprietary models used by different companies and sometimes particular to a given product, such as a digital camera or a printer.

Despite the plethora of color spaces in research and on the market today, they can largely be categorized into two fundamental groups: perceptual-based and physical-based. Perceptual-based color spaces are based on the human visual system, i.e., how people "perceive" colors. The advantage and usefulness of perceptual-based color spaces is in representing colors in a way closely linked to human perception of colors. Example of perceptual color spaces include the standard CIELAB, CIELUV, and CIECAM spaces, the sRGB space proposed by Microsoft Corporation and Hewlett Packard Corporation, most CMYK spaces, film density, and many others.

In contrast, physical-based color spaces are based on the physics of mixing light and photons. The advantage and usefulness of physical-based color spaces is in representing colors in a way closely linked to the physical interaction of color to facilitate rendering and certain color effects such a alpha-blending and anti-aliasing. Examples of physical-based color spaces include the CIEXYZ space, the sRGB64 space proposed by Microsoft Corporation, and various spectral reflection and transmission spaces.

Computers have long been used for processing color images for various editing operations for general color corrections and adding special effects. As the average processing power of home computers has increased tremendously over the last decade or so, computer graphics software applications with significantly improved color processing features have become increasingly popular. For instance, a user may use a digital camera to capture a digital color picture, edit the picture by performing compositing, morphing, or various other computer graphics operations involving color processing, and display or print out the edited color picture. Because of the different color spaces existing and in use today, the image input and output devices and the color processing software on the computer may all use different color spaces.

Conventionally, each color processing software application has its own selected working color space in which all graphics operations are performed. When a color object is imported into the color processing application, a conversion may have to be carried out to convert the input graphics data from the color space used by the input device, which for example may be an RGB color space, into the internal working space of the processing application. The internal working space may be either a perceptual-based color space or a physical-based color space or in some cases a proprietary color space not disclosed to the public. After the color operations are performed, the rendered color image may have to be converted into a color space supported by a target output device, such as a computer CRT monitor or a color printer.

Regardless of which color space is selected for use as the internal working color space for color processing, there is always some tradeoff of the performance of the software and the quality of the processed color image. For instance, while a perceptual-based color space is a natural choice for performing perceptual-based processing functions such as contrast adjustment, it is often difficult to properly perform many physical-based operations such as anti-aliasing and alpha-blending in the perceptual-based color space. Thus, conventional color-processing software products often are incapable of providing satisfactory color-processing quality. The existence of a large number of possible input and output color spaces only makes the matter more complicated.

SUMMARY OF THE INVENTION

In view of the foregoing, the present invention provides a system and method for processing color objects that supports both a perceptual-based color space and a physical-based color space and utilizes the two color spaces in an integrated way to optimize the quality of the color-processing. The graphics engine of the system includes a module for converting a color object from the perceptual-base color space to the physical-based color space and from the physical-based color space to the perceptual-based color space. During a graphic processing process, which may involve various perceptual-based and physical-based operations, the graphics engine automatically converts the color object being processed from one color space to the other depending on the type of color operations to be performed. For instance, if the color object is in the perceptual-based color space and the next operation is a physical-based operation, the graphics engine uses the conversion module to automatically convert the color object into the physical-based color space and then applies the physical-based operation. Subsequently, the color object may be converted back to the perceptual-based color space when a perceptual-based color processing operation is to be performed. In this way, optimal quality of the processed color object and performance of the processing system may be achieved in an integrated manner that is transparent to the end user. Input and output color conversions may be performed to interface with input and output devices that use different color spaces.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
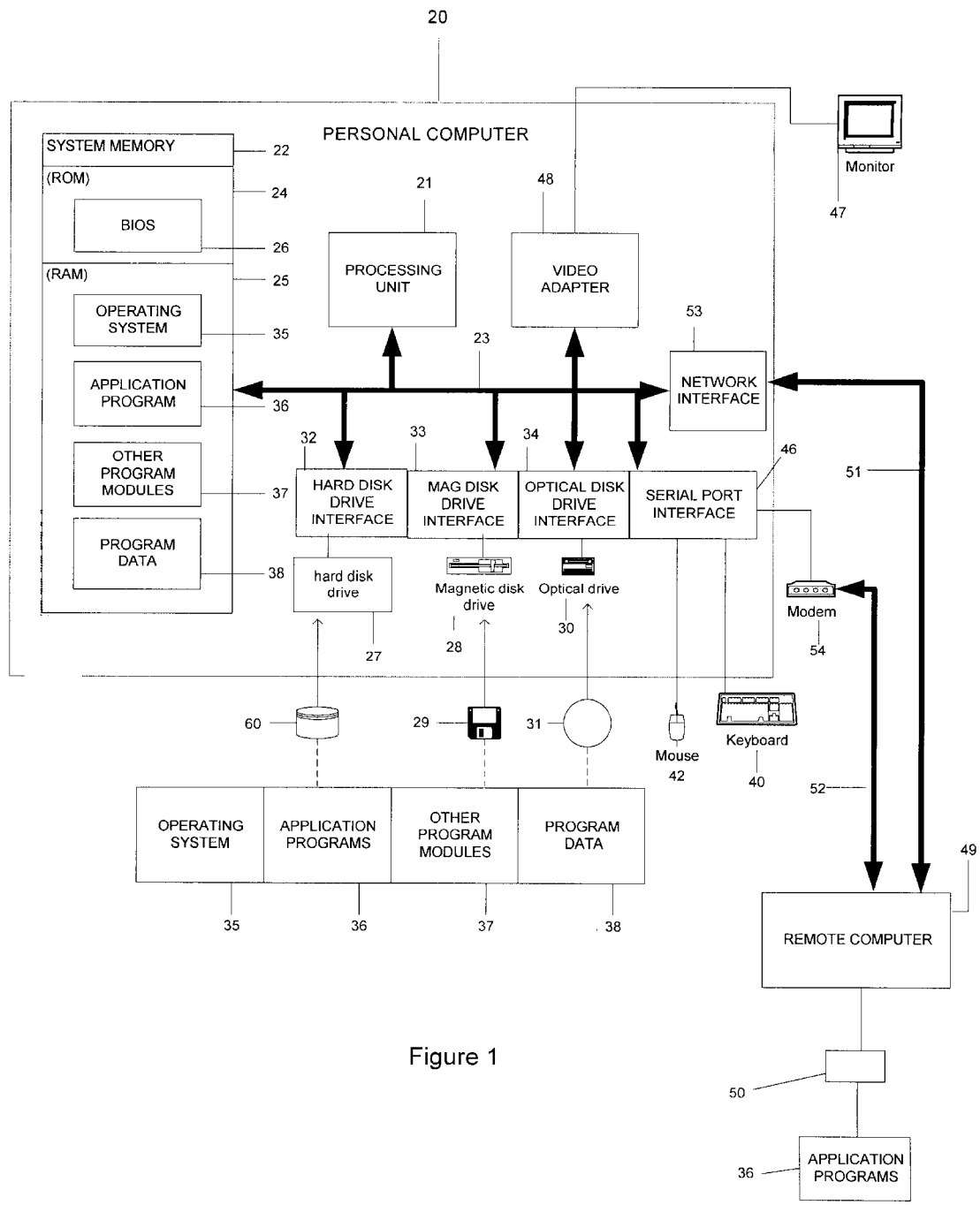
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN). 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
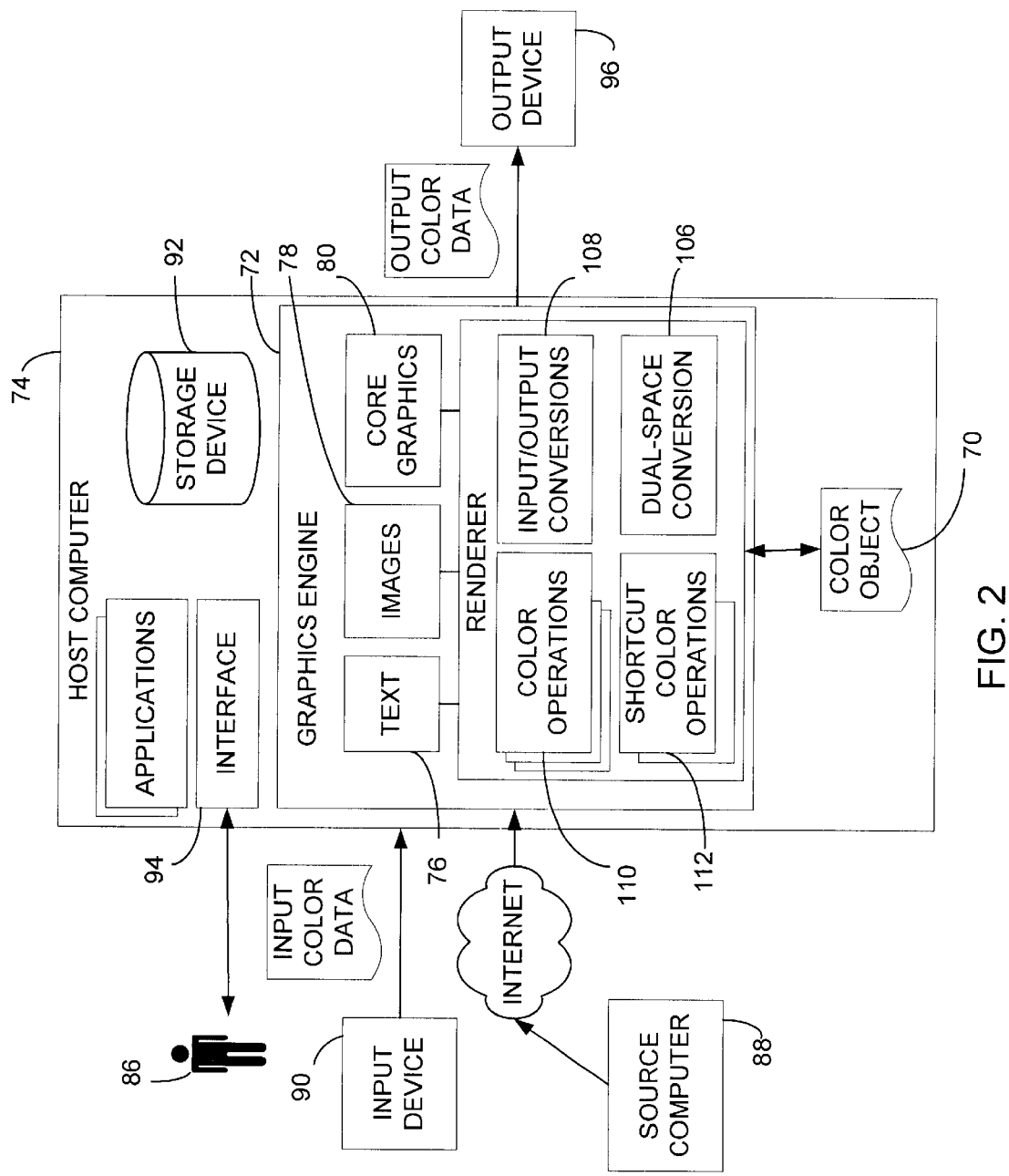
FIG. 2 is a schematic diagram showing an embodiment of a computer graphics processing system that supports integrated dual color spaces for perceptual-based and physical-based color processing operations in accordance with the invention.

Referring now to FIG. 2, the present invention is directed to a way to process color objects that is capable of providing optimal quality of the color processing. In accordance with the invention, the optimal processing quality may be achieved by performing the various color operations in their respective appropriate color spaces. Specifically, the color-processing system in accordance with the invention supports at least a perceptual-based color space and a physical-based color space, which are preferably RGB spaces. Depending on whether the color operation is perceptual-based or physical-based, a color object 70 being processed may be dynamically converted to the color space appropriate for the operation before the operation is performed.

In the illustrated embodiment, the color processing system includes a graphics engine 72 responsible for controlling and performing various computer graphics and color operations. The graphics engine 72 may be part of an operating system of the host computer 74. For example, the graphics engine may be part of the Graphic Device Interface Plus (GDI+) library of the Windows 2000 Operating System by Microsoft Corporation. Alternatively, the graphics engine 72 may be part of a separate computer software application, such as one of the various software products for editing and printing photographic pictures captured by digital cameras. In the illustrated embodiment, the graphics engine 72 includes a component 76 for handling text objects, a component 78 for handling image objects, and another component 80 for handling computer graphics objects generated by digital painting, modeling, or drawing programs. The data of each of these object types are rendered by a renderer 82 into a format suitable for visual representation such as displaying or printing.

In a preferred embodiment, the color data on which various color processing operations may be performed is contained in an object such as the color object 70. The graphics data of the color object may be created on the computer 74 on which the graphics engine 72 resides. For instance, the color object 70 may represent text, images or graphic elements created by a user 86 of the computer using graphics applications that may or may not include the graphics engine as a component. Alternatively, the data of the color object 70 may be imported from another computer. For example, the color data may be downloaded by the host computer 74 over the Internet from another computer 88 as part of the contents of a Web page. In another scenario, the color data may be originally generated by an input device 90. The input device 90 may be, for example, a digital camera, a scanner, a digital video recorder, etc. The processed color object may be stored on a storage device 92, such as a hard disk or recordable digital video disk, etc., and may be used for output to an output device 96 for presenting the graphics data in a form viewable by the user.

Figure 3:
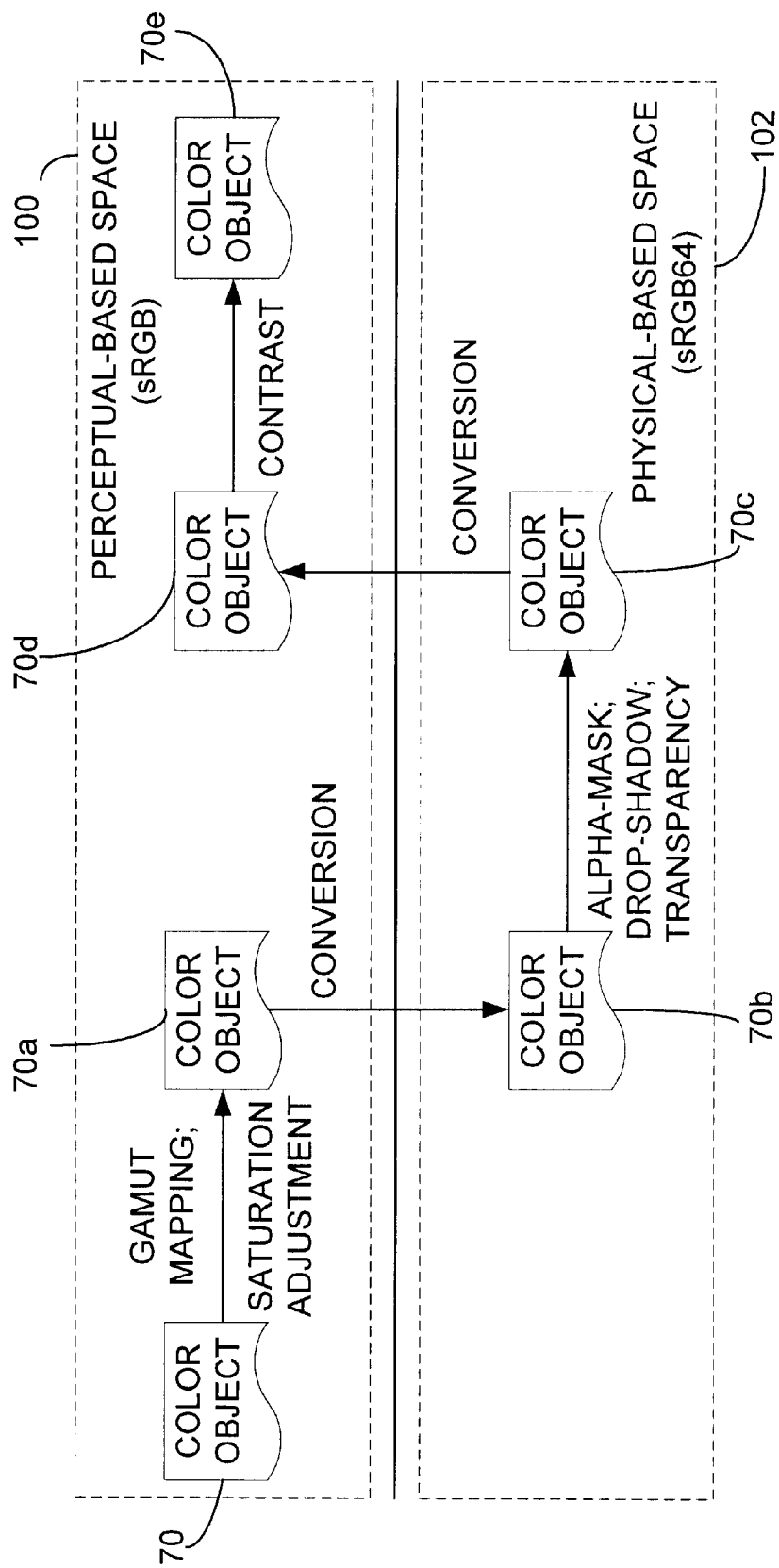
FIG. 3 is a schematic diagram showing an exemplary color processing sequence that involves conversions of a color object being processed between a pair of perceptual-based and physical-based color spaces supported by an embodiment of the invention.

Turning now to FIG. 3, in accordance with the invention, the graphics engine 72 supports both a perceptual-based color space 100 and a physical-based color space 102, which preferably are RGB spaces. Optimal quality of color processing is achieved by selectively performing a color processing operation in the more suitable one of the two color spaces. Generally, the perceptual-based color space is often more suitable for color processing that is closely linked to human perception of colors, such as contrast adjustment, computing acceptable color errors for image compression, cross-device gamut mapping, brightness adjustment, color correction, saturation adjustment, color difference calculation, and some types of texture mapping.

The physical-based color space, on the other hand, is often more useful in dealing with color processing that is closely linked to the physical interactions of colors, such as light rendering models of computer graphics, computer games and motion picture special effects. Additional types of processing better suited for the physical-based color space include anti-aliasing, alpha-blending, convolutions, sharpening, blurring, and simulation of optical lens effects, etc. Some types of texture mapping may also be performed in the physical-based color space.

To allow a physical-based operation to be performed in the physical-based color space and a perceptual-based operation in the perceptual-based color space, the graphics engine 72 includes a conversion module 106 (FIG. 2) to convert the color object between the two processing color spaces of the graphics engine. During the color processing, when the graphics engine 72 determines that the next color processing operation is to be performed in one color space but the color object is currently in the other color space, it uses the conversion module 106 to convert the color object into the color space in which the operation is to be performed. The conversion may be automatic, i.e., without the intervention of the user. Alternatively, the user may be prompted to indicate whether she prefers to keep the color object in the current color space for reasons that will be discussed in greater detail below. The various perceptual-based and physical-based operations to be performed on the a given color object may be, for example, selected by the user through a user interface 94 (FIG. 2), or may belong to a pre-selected sequence programmed or otherwise set in the graphics engine.

By way of example, FIG. 3 illustrates an exemplary sequence of color processing operations. In this example, it is assumed that the color object 70 begins in the perceptual-based color space 100. Two perceptual-based operations, gamut mapping and saturation adjustments, are performed on the color object 70 by corresponding operation modules 110 (FIG. 2) of the graphics engine, and the modified color object is designated 70a. The next color processing operation is alpha-masking, and the graphics engine 72 determines that this operation should be performed in the physical-based color space 102. Accordingly, the graphics engine invokes the dual-space conversion module 106 to convert the color object 70a to the physical-based color space 102, and the converted color object is designated 70b. The alpha-masking operation and two other physical-based operations, drop shadowing and transparency adjustment, are then applied to the converted color object 70b by respective operation modules 110 of the graphics engine, and the modified color object is designated 70c. Thereafter, the graphics engine determines that the next color operation, contrast adjustment, is a perceptual-based operation that should be performed in the perceptual-based color space 100. The graphics engine then again invokes the conversion module 106 to convert the color object 70c into the perceptual color space 100. The contrast adjustment operation is then applied to the converted color object 70d to provide the contrast-adjusted color object 70e.

In a preferred embodiment, the perceptual-based color space 100 is the sRGB color space, and the physical-based color space 102 is the sRGB64 color space. The sRGB color space is defined by a proposed international standard IEC 61966-2-1, and the sRGB64 is defined by a proposed international standard IEC 61966-2-2, both these proposed standards are hereby incorporated by reference. One of the significant advantages of using these two color spaces for color processing is that they form a pair of matched color spaces that have been designed to be closely related and to allow easy conversion between them, which conversion is defined in the proposed standards. For purposes of this invention, "matched color spaces" are spaces that share in common some of their fundamental aspects, including for example selected ones of the white point, primary colors, viewing conditions, or gamma, and/or if a well known and scientifically grounded translation between the two is provided. For example, the sRGB and sRGB64 spaces used in the described embodiment share the same white point and primaries, but have different gammas and viewing conditions. In this regard, sRGB may be viewed as a natural derivative of sRGB64. Where sRGB64 has a gamma of 1.0 (i.e., sRGB64 is a linear color space), and viewing conditions similar to the original scene, sRGB, which has a gamma of 2.2, takes this information and translates it into the viewing conditions for a typical display device by applying a gamma correction. This type of translation is identical to High-Definition TV (HDTV) cameras and displays.

It will be appreciated that in some cases it may be desirable to maintain the color object being processed in one of the dual color spaces supported by the graphics engine 72. For example, in the described embodiment using the sRGB and sRGB64 color spaces for color processing, it may be desirable to keep a color object in the sRGB64 color space in various situations. Those situations include, for example, when the colors of the color object exceed the gamut of sRGB, when the output device supports only sRGB64, etc. In such cases, "shortcut" operation modules 112 (FIG. 2) may be implemented to perform in one color space those operations intended to be performed in the other color space. For instance, the shortcut operation modules may include a module that performs the contrast adjustment operation in the physical-based space. The use of such shortcut operations may result in some sacrifice in the resulting color quality but may offer better system performance. It is, however, preferred that normally each color processing operation is performed in its intended color space.

As mentioned above, many different color spaces are currently used by different computer graphics software products and various input and output devices. As a result, when the graphic data is imported either from another computer or an input device, the color space of the input graphic data may or may not be one of the dual color spaces used by the graphics engine for performing color operations. Likewise, the color space supported by the output device may or may not be one of the dual color spaces. In those cases, color conversions between the input and output color spaces and one of the dual color spaces may be required.

Figure 4:
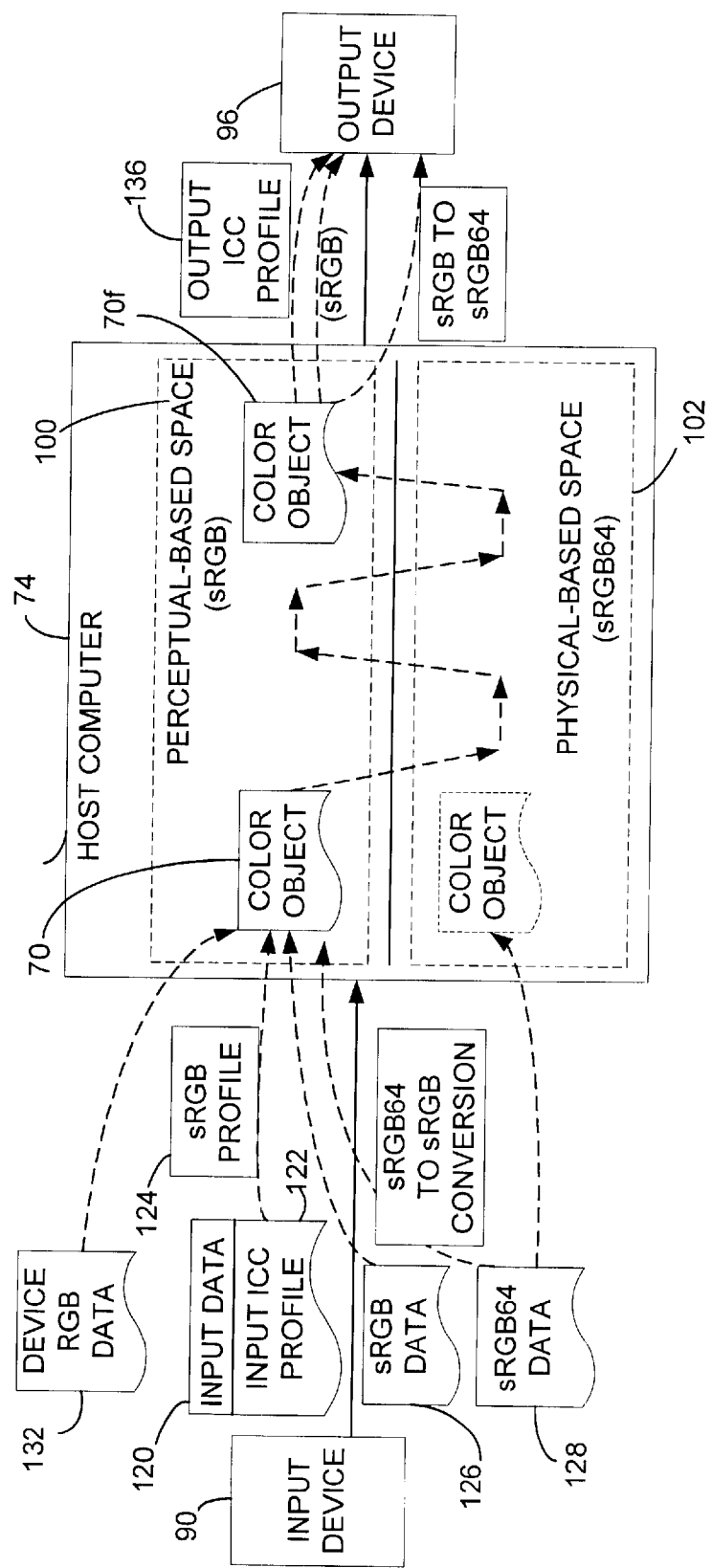
FIG. 4 is a schematic diagram showing possible input and output conversions between the dual processing color spaces supported by an embodiment of the invention and the color spaces of input and output devices.

For instance, FIG. 4 shows several possible types of input and output device color formats. As illustrated, on the input side, the input device 90 may support the International Color Consortium (ICC) standard defined in ICC Specification ICC.1:1998-09, the sRGB color space, the sRGB64 color space, or only a proprietary RGB color space,. These possibilities are by no means intended to be exhaustive and are provided here only for the purpose of illustrating the potential need for converting color data for input and output purposes.

In the case the input device supports the ICC standard, the color data 120 provided by the input device will have attached thereto a device color profile 122 that may be used for color conversion to other spaces. For instance, if the target color space is SRGB, the ICC profile 124 of the sRGB space can be used together with the ICC profile 122 of the input device to convert the color data 120 to the sRGB color space 100 to form the color object 70. Similarly, if the target color space is sRGB64, the ICC profile for sRGB64 can be used for the conversion. Whether the conversion of the input data is to the sRGB or sRGB64 space may be decided in different ways. For instance, the conversion may be by default to the sRGB color space, but with the default setting changeable to sRGB64 by the user. Alternatively, the decision may be automatically made by the graphics software based various factors such as a preference for processing quality or performance indicated by the user, or whether the output device supports either sRGB or sRGB64.

In contrast, if the graphic data provided by the input device are already in either the sRGB or sRGB64 space, then preferably the color data 126 or 128 are used to create a color object in the respective color space so that no color space conversion is required. It is, however, possible to require that all input color data always be converted, if necessary, to a pre-selected one of the dual color spaces so that the color object will always start in that color space. In another scenario, if the input device 90 uses a proprietary RGB color space and no information is provided as to color space conversion, then the color data 132 may simply be treated as if they were in the SRGB color space or in the sRGB64 color space.

On the output side, typically the native color space of the output device 96 is an RGB space if the output device is a CRT display or a CMYK space if it is a printer. The final processed color object 70f may have to be converted into a color space supported by the output device if it is different from that of the processed color object. For instance, if the processed color object 70f is in the sRGB space 100 and the output device 96 supports the ICC standard, the ICC profile 136 of the output device is provided to the graphics engine. The graphics engine 72 then uses the ICC profile for sRGB together with the profile 136 of the output device for converting the color object 70f into color data for the device color space. A similar conversion is made when the processed color object is in the sRGB64 space and the output device profile is known. If the output device 72 supports either sRGB or sRGB64 and the processed color object is in that color space, then no conversion is needed. If, however, the processed object 70f is in the sRGB space and the device supports the sRGB64 space, or vise versa, a conversion of the color object to the other color space may be easily performed to provide the color data for the output device 96.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable components for processing color objects, comprising:
   a processing space conversion module for converting a color object being processed between a perceptual-based color space and a physical-based color space;
   perceptual-based color operation modules for performing perceptual-based color operations on the color object in the perceptual-based color space;
   physical-based color operation modules for performing physical-based color operations on the color object in the physical-based color space;
   a control component for determining whether the color object is in one of the perceptual-based and physical-based color spaces and a next color operation is to be performed in the other color space and, if so, invoking the processing space conversion module to convert the color object into the other color space and invoking a color operation module for the next color operation to operate on the converted color object.

2. A computer-readable medium as in claim 1, wherein the perceptual-based color space is a perceptual-based RGB space, and the physical-based color space is a physical-based RGB space.

3. A computer-readable medium as in claim 1, wherein the perceptual-based and physical-based color spaces form a matched pair of color spaces.

4. A computer-readable medium as in claim 3, wherein the perceptual-based color space is the sRGB color space, and the physical-based color space is the sRGB64 color space.

5. A computer-readable medium as in claim 1, wherein the perceptual-based color operation modules include an operation module for performing on the color object a color operation selected from the group of contrast adjustment, brightness adjustment, gamut mapping, color correction, saturation adjustment, color difference calculation, and texture mapping.

6. A computer-readable medium as in claim 1, wherein the physical-based color operation modules include an operation module for performing on the color object a physical-based color operation selected from the group of light rendering, anti-aliasing, alpha-blending, convolution, sharpening, blurring, simulation of optical lens effects, and texture mapping.

7. A computer-readable medium as in claim 1, further including an input conversion module for converting input graphic data from an input device into a selected one of the perceptual-based and physical-based color spaces for forming a color object.

8. A computer-readable medium as in claim 7, wherein the input conversion module converts the input graphic data based on a color profile of the input device.

9. A computer-readable medium as in claim 7, further including an output conversion module for converting a processed color object from one of the perceptual-based and physical-based color spaces into a color space supported by an output device.

10. A computer-readable medium as in claim 9, wherein the output conversion module converts the processed color object using a color profile of the output device.

11. A computer-readable medium as in claim 1, further including at least one cross-space operation module for performing a color operation belonging to one of the perceptual-based and physical-based color spaces in the other one of the perceptual-based and physical-based color spaces.

12. A computer-readable medium as in claim 1, wherein the computer-executable components belong to a computer operating system.

13. A computer-readable medium having computer-executable instructions for performs steps for processing a color object, comprising:
   determining which of first and second processing color spaces the color object is in, one of the first and second processing color spaces being a perceptual-based color space and the other being a physical-based color space;
   determining in which of the first and second processing color spaces is a color operation to be performed on the color object;
   if the color object is in the first processing color space and the color operation is to be performed in the second processing color space, invoking a processing space conversion module to convert the color object from the first processing color space to the second processing color space; and
   performing the color operation on the color object.

14. A computer-readable medium as in claim 13, wherein one of the first and second color spaces is a perceptual-based RGB color space and the other is a physical-based RGB color space.

15. A computer-readable medium as in claim 13, wherein the first and second color spaces form a matched pair of color spaces.

16. A computer-readable medium as in claim 15, wherein one of the first and second color spaces is the sRGB space and the other is the sRGB64 color space.

17. A computer-readable medium as in claim 13, having further computer-executable instructions to perform a step of converting input graphic data into a selected one of the first and second color spaces for forming the color object.

18. A computer-readable medium as in claim 17, wherein the step of converting the input graphic data converts the input graphic data based on a color profile of an input device.

19. A computer-readable medium as in claim 13, having further computer-executable instructions to perform a step of converting the color object into an output color space supported by an output device.

20. A computer-readable medium as in claim 19, wherein the step of converting the color object into the output color space performs a conversion based on a color profile of the output device.

* * * * *

UNITED STATES PATENT AND TRADEMARK OFFICE
CERTIFICATE OF CORRECTION

PATENT NO. : 6,462,748 B1
DATED : October 8, 2002
INVENTOR(S) : Fushiki et al.

It is certified that error appears in the above-identified patent and that said Letters Patent is hereby corrected as shown below:

<u>Column 2,</u>
Line 2, "...continued on next line" should be deleted.

<u>Column 8,</u>
Lines 13 and 38, "SRGB" should read -- sRGB --.

Signed and Sealed this

Seventh Day of October, 2003

JAMES E. ROGAN
*Director of the United States Patent and Trademark Office*